United States Patent [19]

Araki

[11] Patent Number: 5,512,919
[45] Date of Patent: Apr. 30, 1996

[54] THREE-DIMENSIONAL COORDINATES INPUT APPARATUS

[75] Inventor: Yoshitsugu Araki, Tokorozawa, Japan

[73] Assignee: Pioneer Electronic Corporation, Tokyo, Japan

[21] Appl. No.: 40,276

[22] Filed: Mar. 30, 1993

[30] Foreign Application Priority Data

Mar. 31, 1992 [JP] Japan .................................. 4-105558

[51] Int. Cl.$^6$ .................................................. G09G 5/00
[52] U.S. Cl. ............................... 345/156; 345/158; 414/1
[58] Field of Search .................................. 340/706, 710;
74/471; 345/156, 157, 158, 161, 162, 163,
168, 184; 414/1–6; 84/600

[56] References Cited

U.S. PATENT DOCUMENTS

| | | | |
|---|---|---|---|
| 4,498,139 | 2/1985 | Malinovsky | 340/706 |
| 4,787,051 | 11/1988 | Olson | 340/710 |
| 4,812,829 | 3/1989 | Ebina et al. | 340/706 |
| 4,988,981 | 1/1991 | Zimmerman | 340/706 |
| 5,151,553 | 9/1992 | Suzuki et al. | 84/600 |
| 5,184,319 | 2/1993 | Kramer | 345/156 |

OTHER PUBLICATIONS

Nakano, et al.; Hitachi's Robot Hand, Robotics Age, 1984 pp. 18–20.

Primary Examiner—Richard Hjerpe
Assistant Examiner—Steven J. Saras
Attorney, Agent, or Firm—Fish & Richardson

[57] ABSTRACT

A three-dimensional coordinates input apparatus in which a hand detecting plate and finger detecting portions are set into contactless states for the hand and fingers and the hand detecting plate and finger detecting portions are moved or rotated in accordance with the motions of the hand and fingers, thereby obtaining graphic data. When an object of three-dimensional computer graphics is grasped by the hand of the graphics based on the three-dimensional coordinates data, the finger detecting portions are depressed to the fingers in the real space, thereby giving a tactile sensation to the fingers. Further, the motion of the hand is detected by an infrared sensor.

2 Claims, 9 Drawing Sheets

FIG. 3
(PROR ART)

THREE-DIMENSIONAL COORDINATES INPUT APPARATUS

BACKGROUND OF THE INVENTION

1. Field of the Invention

The present invention relates to a three-dimensional coordinates input apparatus for obtaining three-dimensional coordinates data in order to manipulate an object of a three-dimensional CG (computer graphics) freely by using a stereographic image produced by three-dimensional CG.

2. Description of Background Information

In recent years, interest to the in VR (virtual reality) is growing, for producing an interface that is easy to operate for a person by the use of a stereographic image produced by a three-dimensional CG.

VR pertains to techniques for producing an artificial space into a space around the operator and for moving an object in such an artificial space as if it were a real object. Application of such a VR is expected to a variety of fields such as design, research and development, simulation, and the like. Developments of game machines for game centers, pseudo-experience systems used in showrooms, auxiliary apparatuses for the instruction of assembly works, and the like have been started using VR.

Figure 1:
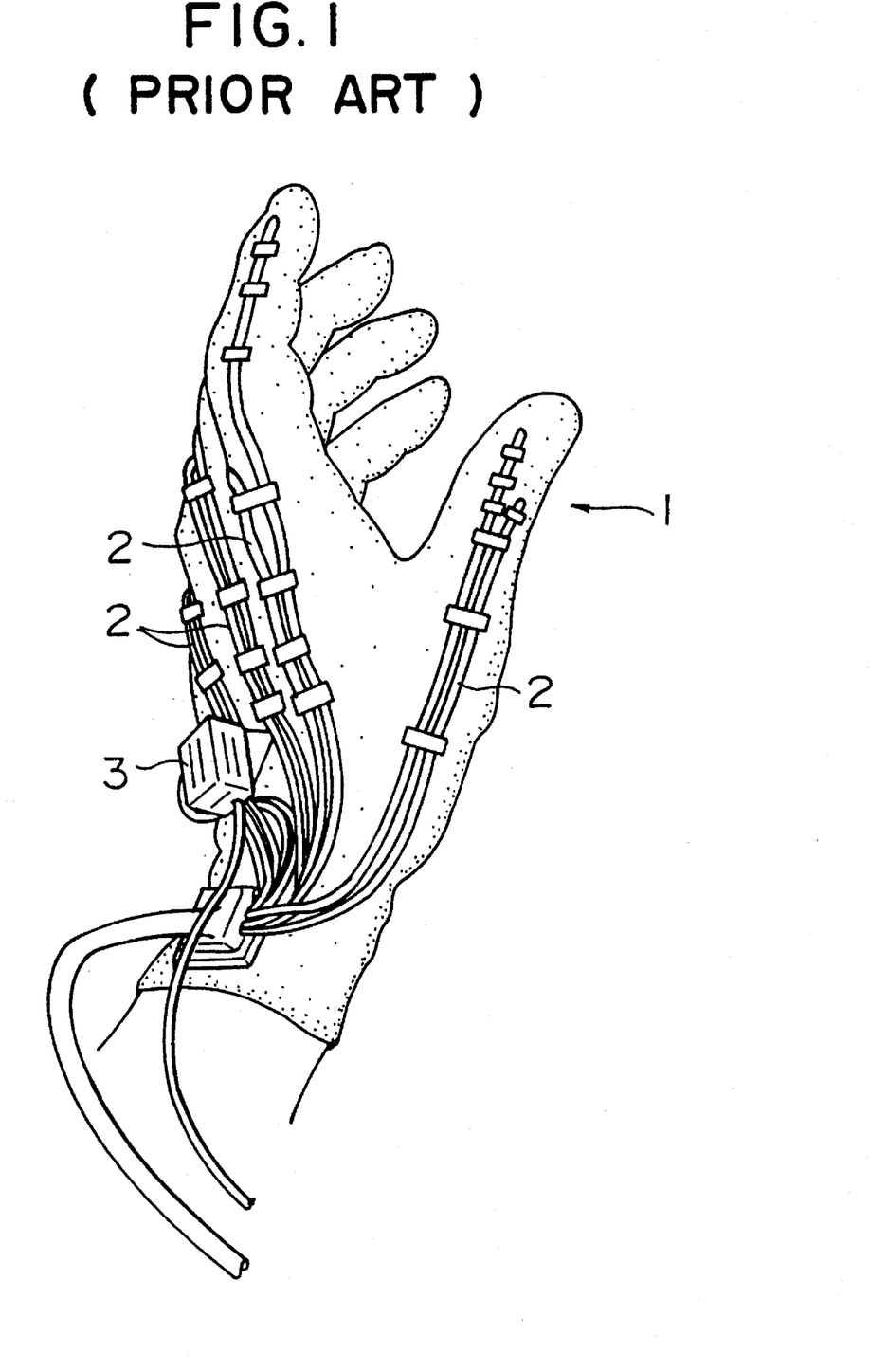
FIG. 1 is a perspective view showing a data glove as an example of a conventional three-dimensional coordinates input apparatus.

FIG. 1 shows a data glove, as an example of a conventional three-dimensional coordinates input apparatus. As shown, optical fibers 2 for detecting the posture of a hand are adhered onto the surface of the data glove generally denoted by 1. A magnetic sensor 3 for detecting the position of the hand is attached to the portion of the data glove 1 which contacts with back of the hand.

In the three-dimensional coordinates input apparatus with such a construction, data indicative of the position and posture of the hand is generated by the data glove 1 put on by the operator and, further, eye-phones or the like attached to the head of the operator, where the operator arbitrarily moves the hand or fingers in the real space. The position and posture of the image of the hand of three-dimensional CG which is displayed on a display of the eye-phones or the like can be changed on the basis of the acquired data, so that the image displayed in a screen can be grasped or moved realistically.

Figure 2:
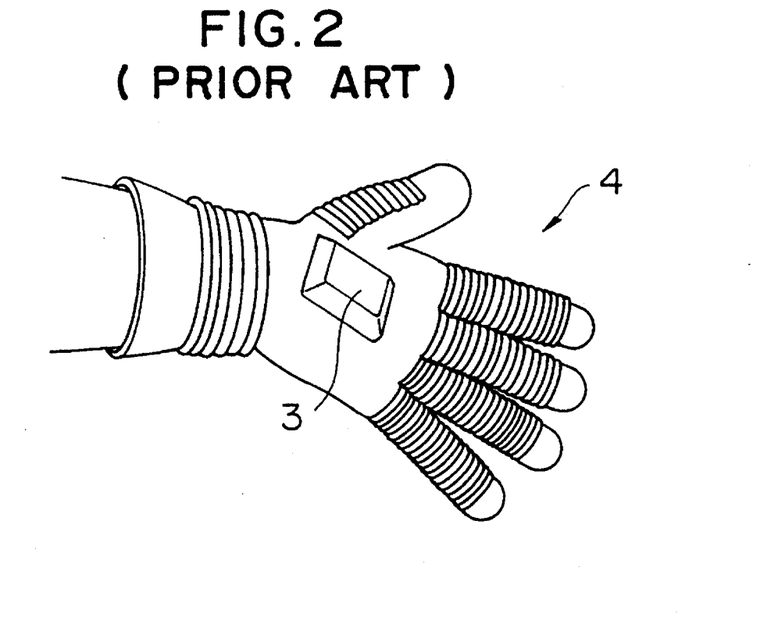
FIG. 2 is a perspective view showing a touch glove as another example of the conventional three-dimensional coordinates input apparatus.

FIG. 2 shows a touch glove as another example of the conventional three-dimensional coordinates input apparatus. This example shows a touch glove 4 having not only a function of detecting the motion of the hand or the motions of the fingers by the optical fibers (not shown) and the magnetic sensor 3, but also a function to feed back a tactile sensation to a certain degree by a pneumatic pressure.

Since the tactile sensation is produced to a certain degree as mentioned above, a pseudo-experience in a three-dimensional space becomes more realistic.

Figure 3:
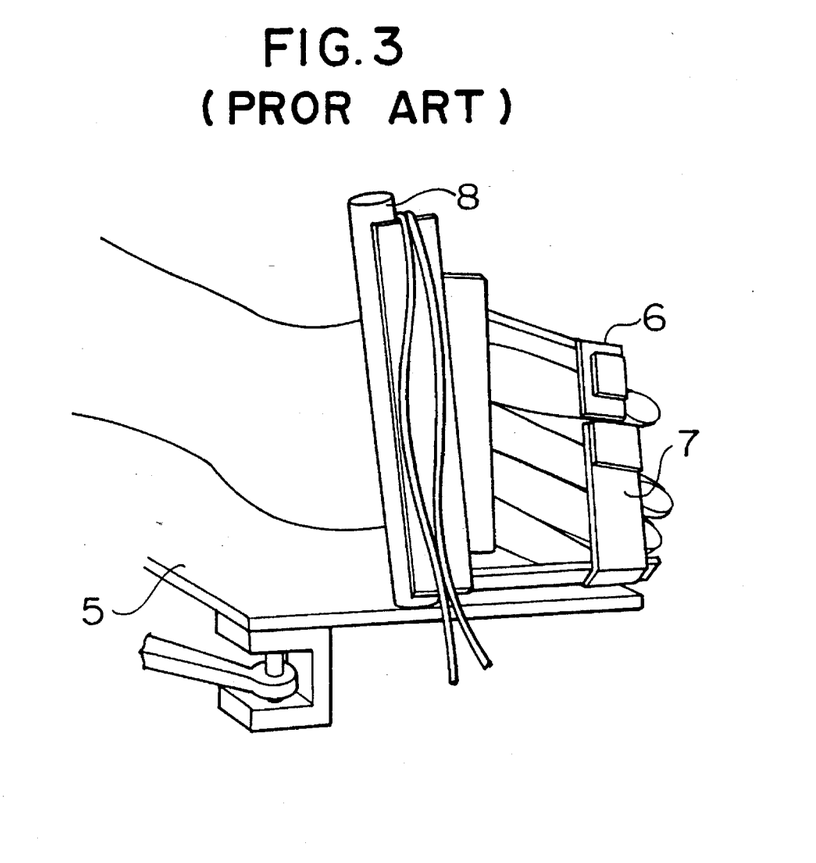
FIG. 3 is a perspective view showing a manipulator as another example of the conventional three-dimensional coordinates input apparatus.

FIG. 3 shows a manipulator as a further example of a three-dimensional coordinates input apparatus which can produce a certain degree of tactile sensation. Six degrees of freedom are given at a position under a supporting base plate 5 for allowing the manipulator to trace the motion of the hand. In order to allow the manipulator to trace the motions of the fingers, three actuators, namely, first finger portion (not shown), second finger portion 6, and third finger portion 7 are provided.

The first finger portion (not shown) detects the motion of the thumb. The second finger portion 6 detects the motion of the forefinger. The third finger portion 7 detects the motions of the middle finger, third finger, and little finger.

Rotary axes of the three actuators are made coaxial with a joint shaft 8 attached to the supporting base plate 5.

For instance, in such a case that a ball in the screen is likewise grasped by the image of the hand in the screen, an elasticity of the ball is fed back to the fingers of the hand.

The above-described manipulator is designed to manage the motion of the wrist primarily. A master manipulator using a serial link tracing the whole motion of the arm also has been developed.

Furthermore, a method of directly detecting the motion of the hand or fingers by image processing has also been proposed.

All of the foregoing three-dimensional coordinates input apparatuses, however, has an inconvenience that the position detection indicative of the motion of the hand is performed by measuring the position and azimuth of the whole hand relative to a reference position by using the magnetic sensor 3 attached to the data glove 1, so that a response speed is not high enough, so that the motion of the hand in the screen remained slow. Furthermore, with each of the three-dimensional coordinates input apparatuses, it is necessary to put on the data glove 1 or touch glove 4 to the hand or to insert the corresponding finger one by one into the first finger portion, second finger portion 6, and third finger portion 7 of the manipulator, so that there are also inconveniences such that the operations to put on those gloves and to insert the fingers into the finger portions are annoying and, further, the user may have a feeling of discordancy.

The method of directly detecting the motion of the hand or fingers by image processes, on the other hand, has inconveniences such that the recognition precision of those motions are not so good, so it complicates the production of graphic data, so that there arises not only a problem of low response speed but also an increase of the system scale.

The present invention has been made in consideration of the above circumstances and it is an object of the invention to provide a three-dimensional coordinates input apparatus which accurately and easily detects the motion of the hand or fingers in a real space by using a simple construction and doesn't produce a feeling of discordancy for the motion of the hand or fingers in the real space.

OBJECTS AND SUMMARY OF THE INVENTION

A three-dimensional coordinates input apparatus for supplying three-dimensional coordinates data according to the present invention comprises: hand detecting means for detecting a position and a posture of a hand; finger detecting means for detecting positions and postures of fingers; hand detection means moving means for moving the hand detecting means in the horizontal and vertical directions; rotating means for rotating the finger detecting means; tracing means for allowing the hand detecting means to approach the palm of the hand to a position of a predetermined distance when the palm of the hand is put over the hand detecting means and for allowing the hand detecting means to trace the movement of the hand; finger detection means bending means for bending the finger detecting means in accordance with bending states of the fingers when the fingers are bent to a position near the finger detecting means;

coordinate data producing output means for producing the three-dimensional coordinate data of the hand and fingers on the basis of the results of the detections of the positions and postures of the hand and fingers in the real space by the hand detecting means and the finger detecting means and for generating the three-dimensional coordinates data; and tactile giving means for giving a tactile sensation by depressing the finger detecting means to the fingers.

According to the three-dimensional coordinates input apparatus of the present invention, motions of the hand and fingers in the real space are accurately and easily detected by a simple construction and a feeling of discordancy is not produced for the motions of the hand and fingers in the real space. When the palm of the hand is put over the hand detecting means, the hand detecting means is made to approach the palm of the hand to a predetermined distance and is also moved so as to trace the movement of the hand. When the fingers are bent at a position near the finger detecting means, the finger detecting means is bent in accordance with the bending state of the fingers. On the basis of the results of the detections of the positions and postures of the hand and fingers by the hand detecting means and the finger detecting means, three-dimensional coordinates data of the hand and fingers is produced. When the hand of the computer graphics formed on the basis of the three-dimensional coordinates data grasps an object of the three-dimensional computer graphics, the finger detecting means is depressed to the fingers in the real space, thereby giving a tactile sensation.

BRIEF DESCRIPTION OF THE DRAWINGS

FIGS. 7 through 9 are diagrams showing the mechanism for driving the hand detection plate, wherein

DETAILED DESCRIPTION OF THE PREFERRED EMBODIMENTS

Embodiments of the present invention will now be described in detail hereinbelow with reference to the drawings.

Figure 4:
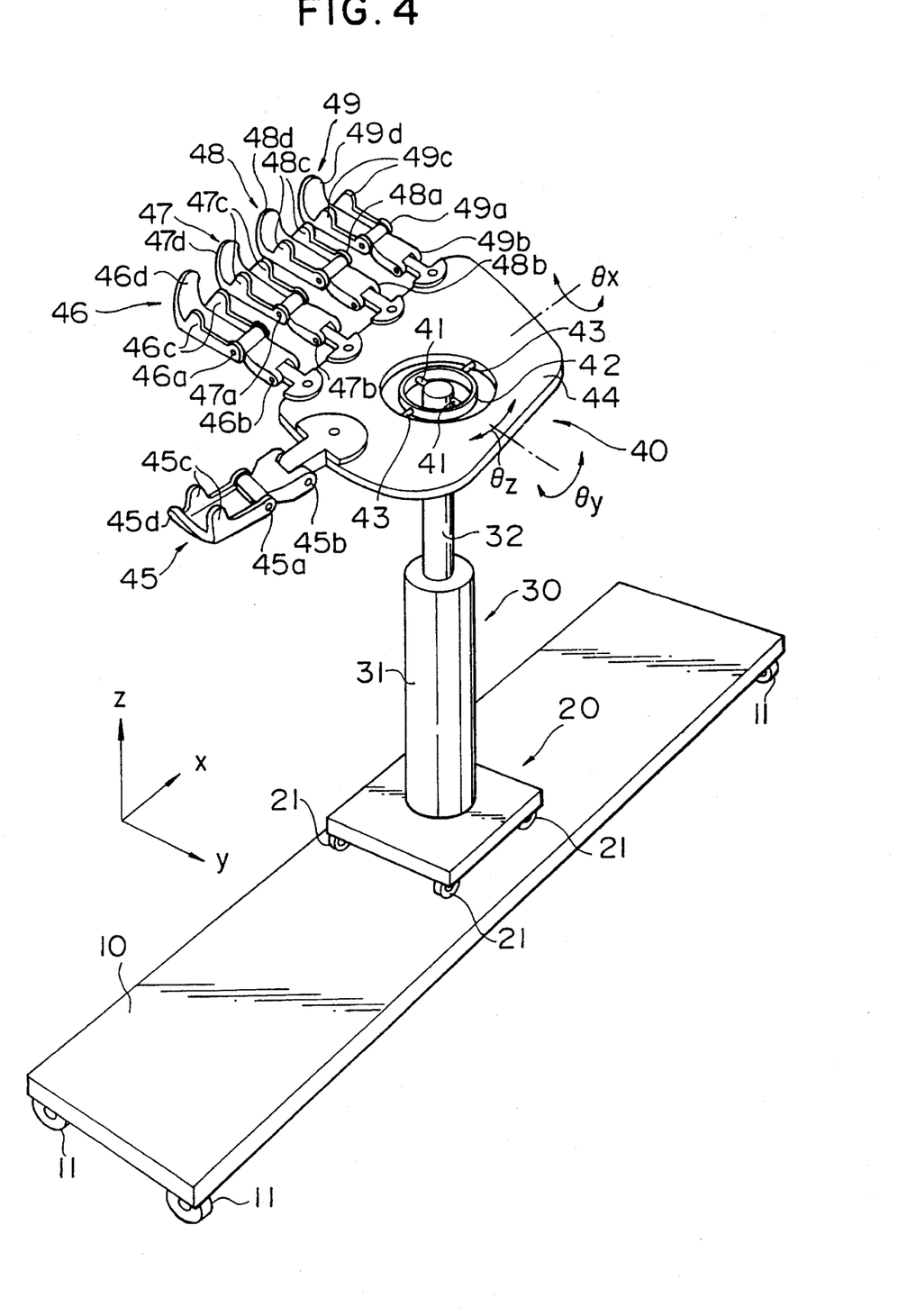
FIG. 4 is a perspective view showing an embodiment of a three-dimensional coordinates input apparatus of the invention.

FIG. 4 shows an embodiment of a three-dimensional coordinates input apparatus according to the present invention. The apparatus has a moving truck 10 which is movable in the y direction. A supporting truck 20 which is movable in the x direction is mounted on the moving truck 10. A hand detecting portion 40 for detecting the motion of the hand and the motions of the fingers is attached above the supporting truck 20 through a drive shaft 30 which can be freely expanded or contracted in the z direction.

Casters 11 are attached to the bottom surface of the moving truck 10. Driving forces to the casters 11 are obtained by DC motors (not shown).

Casters 21 are attached to the supporting truck 20 in a manner similar to that mentioned above. Driving forces to the casters 21 are obtained by DC motors (not shown).

The means for moving the moving truck 10 and supporting truck 20 in the x and y directions are not limited to the casters 11 and 21 but can also use another driving means such as linear motors or the like.

The drive shaft 30 has a movable shaft 32 which is supported by a supporting shaft 31 and can be freely expanded or contracted in the z direction and is rotatable in the $\theta_z$ direction.

The hand detecting portion 40 has a ring member 42 attached to an edge portion of the movable shaft 32 through the supporting rod 41. The ring member 42 is rotatable in the $\theta_y$ direction through the supporting rod 41.

A hand detecting plate 44 to detect the motion of the hand in the real space is attached to the outer periphery of the ring member 42 through a supporting rod 43. The hand detecting plate 44 is rotatable in the $\theta_x$ direction by the rotation of the supporting rod 43.

The hand detecting plate 44 is, consequently, rotatable in the $\theta_x$, $\theta_y$, and $\theta_z$ directions by a gimbal construction due to the supporting rods 41 and 43 and the ring member 42 and by a combination of the rotating operation of the movable shaft 32.

Five finger detecting portions 45 to 49 each for detecting the motion (posture) of the finger in the real space and for giving a tactile sensation to the finger are attached to the edge portions of the hand detecting plate 44.

Each of the finger detecting portions 45 to 49 has two degrees of freedom by respective axes (45a and 45b; 46a and 46b; 47a and 47b; 48a and 48b; 49a and 49b). The finger detecting portions 45 to 49 have finger position lateral direction detecting portions 45c, 46c, 47c, 48c, and 49c for detecting the positions in the lateral direction of the fingers put over the finger detecting portions 45 to 49, respectively. Front edge portions of the finger detecting portions 45 to 49 are upwardly bent to thereby form finger tip detecting portions 45d, 46d, 47d, 48d, and 49d, thereby detecting the positions of the finger heads in the real space, respectively.

The hand detecting plate 44 uses, for instance, an infrared sensor 44A to detect the position of the hand and the distance between the sensor 44A and the hand in the real space. The infrared sensor 44A will be described hereinafter. For example, ultrasonic sensors 45A, which will be explained hereinafter, are used as finger detecting portions 45 to 49 in order to detect the distances between the sensors and the fingers.

As a sensor to detect the position of the hand and the distance between the sensor and the hand in the real space, it is possible to use any sensor which can detect that the palm of the hand approached and can detect the distance between the sensor and the hand or fingers. The invention is not limited to the infrared sensor 44A, ultrasonic sensor 45A, or the like but can also use other sensors such as photo sensors, mechanical sensors, or the like.

Figure 5:
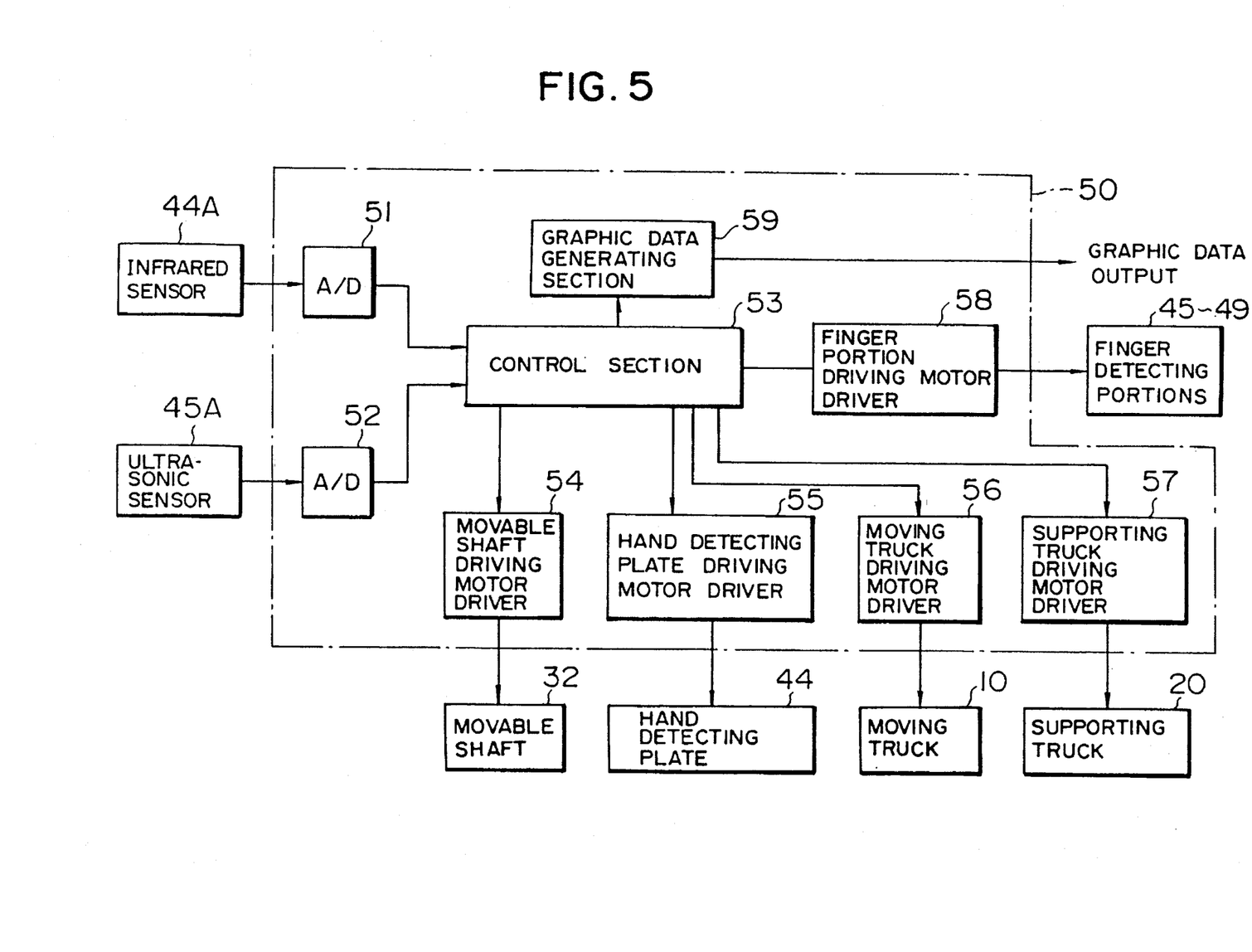
FIG. 5 is a block diagram showing a construction of a control system for controlling the operation of the three-dimensional coordinates input apparatus of FIG. 4.

FIG. 5 briefly shows a construction of a control system for controlling the operation of each component element of the three-dimensional coordinates input apparatus of FIG. 4. A/D converters 51 and 52 of a control section 50 convert the detection signals from the infrared sensor 44A and ultrasonic sensor 45A into the digital signals and supply the digital signals to a control section 53.

The control section 53 moves the moving truck 10 and supporting truck 20 in the x and y directions through a moving truck driving motor driver 56 and a supporting truck driving motor drive 57 on the basis of the result of the detection of the infrared sensor 44A, respectively.

The control section 53 supplies control signals to a movable shaft driving motor driver 54 and a hand detecting plate driving motor driver 55 on the basis of the result of the detection of the ultrasonic sensor 45A, thereby moving the movable shaft 32 in the z and $\theta_z$ directions and rotating the flat plate 44 in the $\theta_x$, $\theta_y$, and $\theta_z$ directions, respectively.

The control section 53, further, rotate the finger detecting portion 45 in the $\theta_y$ direction and the finger detecting portion 44 to 49 in the $\theta_x$ direction through a finger portion driving motor driver 58 on the basis of the result of the detection of the ultrasonic sensor 45A, respectively. The finger detecting portions 45 to 49 are rotated around the axes (45a and 45b; . . . ; 49a and 49b) as fulcrums in accordance with the postures of the fingers in the real space.

The control section 53, moreover, depresses the hand detecting plate 44 to the palm of the hand in the real space or rotates the finger detecting portions 45 to 49 in the $\theta_x$ and $\theta_y$ directions and gives depressing forces to the fingers in the real space in order to give a tactile sensation to the hand and fingers when the hand of the computer graphics grasps the image in the screen.

A graphic data generating portion 59 produces graphic data indicative of the position of the hand and the postures of the fingers and the like on the basis of the results of the detections of the infrared sensor 44A and ultrasonic sensor 45A and generates the graphic data.

Details of the mechanisms driven by the motor drivers 54 though 58 shown in FIG. 5 will be described with reference to FIGS. 6 through 9 of the accompanying drawing.

Figure 6:
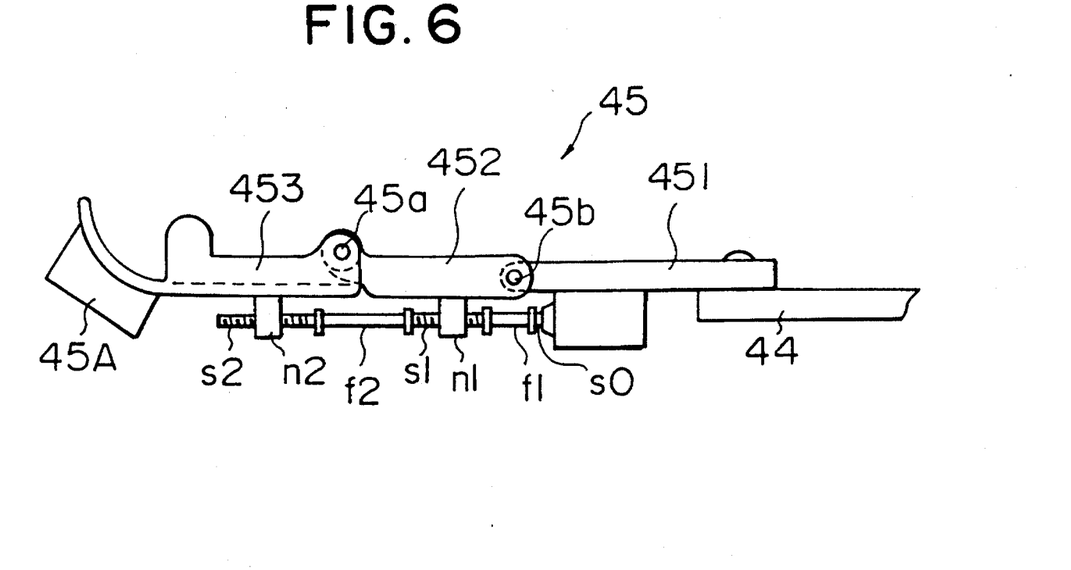
FIG. 6 is a diagram showing the driving mechanism of the finger detecting portion.

FIG. 6 shows a diagram exemplary showing the structure of the driving mechanism of the finger detecting portion 45, for the explanation of the driving mechanisms of the finger detecting portions 45 through 49. As shown in the figure, on the lower face of a first section 451 of the finger detecting portion 45 which is hingedly connected to the edge portion of the hand detecting plate 44, there is provided a motor 45m arranged along a longitudinal direction of the first section 451. On the lower face of a second section 452 hingedly connected to the first section 451 by means of the shaft 45b, there fixed is a nut n1 into which a first screw s1 is inserted to be meshed therewith. The first screw s1 is connected to a rotating shaft s0 of the motor 45m via a flexible wire f1, so that the rotating shaft s0 and the first screw s1 can be flexibly bent about their connecting point but cannot be rotatably displaced relative to each other.

Similarly, on the lower face of a third section 453 hingedly connected to the second section 452 by means of the shaft 45a, there fixed is a nut n2 into which a second screw s2 is inserted to be meshed therewith. The second screw s1 is connected to the first screw s1 via a flexible wire f2, so that the first and second screw s2 can be flexibly bent about their connecting point but cannot be rotatably displaced relative to each other.

With the structure described above, when the shaft S0 of the motor 45m is rotated by a driving current from the motor driver 58, the screws S1 and S2 is rotated accordingly, so that changes occur in their relative position with respect to the nuts n1 and n2. As a result of these displacements, the distance between the motor 45m and the nut n1, as well as the distance between the nuts n1 and n2 is changed, to produce swinging motion of the second section 452 and the third section 453 about the shafts 45b and 45a, respectively. In this way the finger detecting portion 45 is moved in like manner as the finger of a person. In order that the distance between the nuts n1 and n2 is varied, it is desirable to make the pitches of the screws S1 and S2 different from each other, such that the pitch of the second screw S2 is larger than that of the first screw s1. Of course, the pitches of the thread of the nuts n1 and n2 should be made different from each other, to match the pitches of the screws s1 and s2.

Furthermore, in place of the flexible wire f1 or f2, any joint element such as the so-called universal joint may be used.

On the back face of the third section 453 of the finger detecting portion 45, there disposed is a ultrasonic sensor 45A, to emit a ultrasonic sound, in FIG. 6, obliquely upward. The reflection of the emitted ultrasonic sound which occurs when the finger of the user approaches to the finger detecting portion 45 is also detected by this ultrasonic sensor 45A. The use of a single sensor unit 45 for both emission and reception purposes is enabled by a time-division operation of the emission and reception of the ultrasonic sound. In the block diagram of FIG. 5, only the ultrasonic sensor 45A is depicted. However, it is desirable to provide ultrasonic sensors 45A through 49A on the finger detecting portions 45 through 49 respectively, and the output signals of these sensors 45A through 49A are sequentially monitored in the control section 53 by using a multiplexer for the selection of the input signals.

Figure 7:
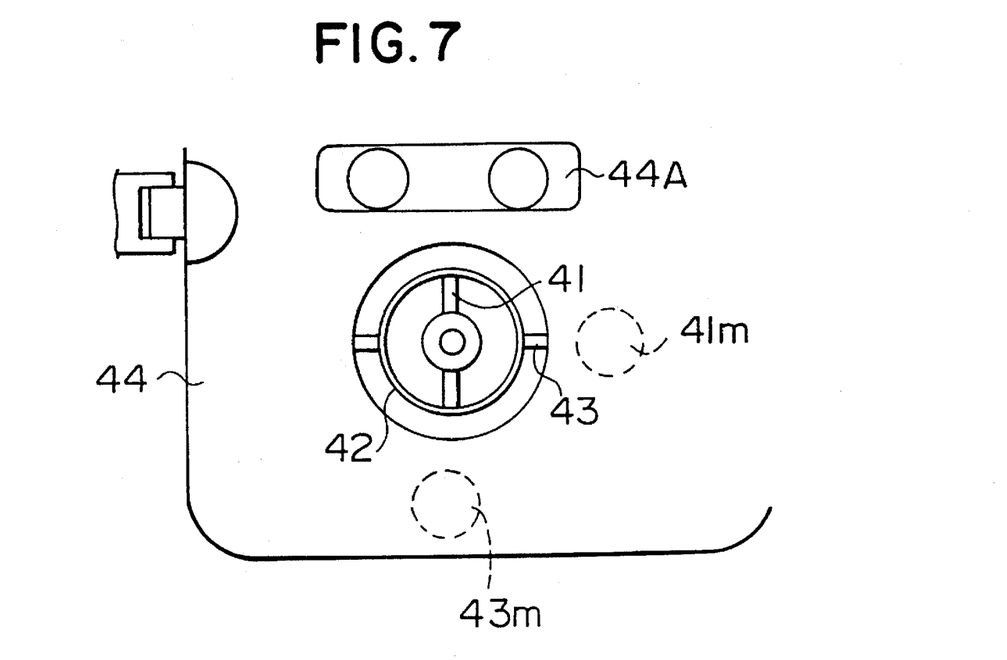
FIG. 7 is a plan view showing a central part of the hand detecting plate.
Figure 8:
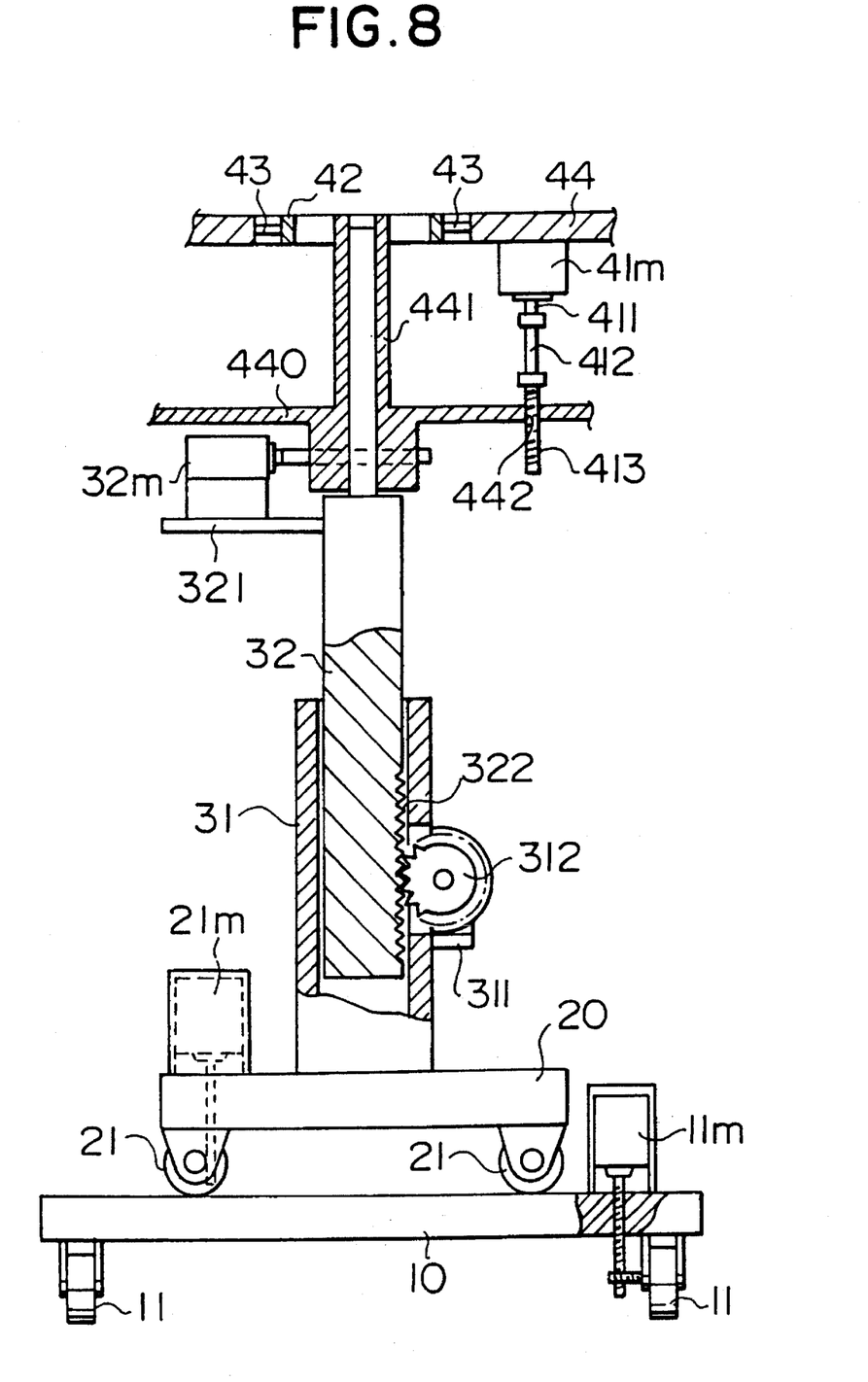
FIGS. 8 and 9 are partly cross-sectional front and side views showing the support structure of the hand detecting plate.
Figure 9:
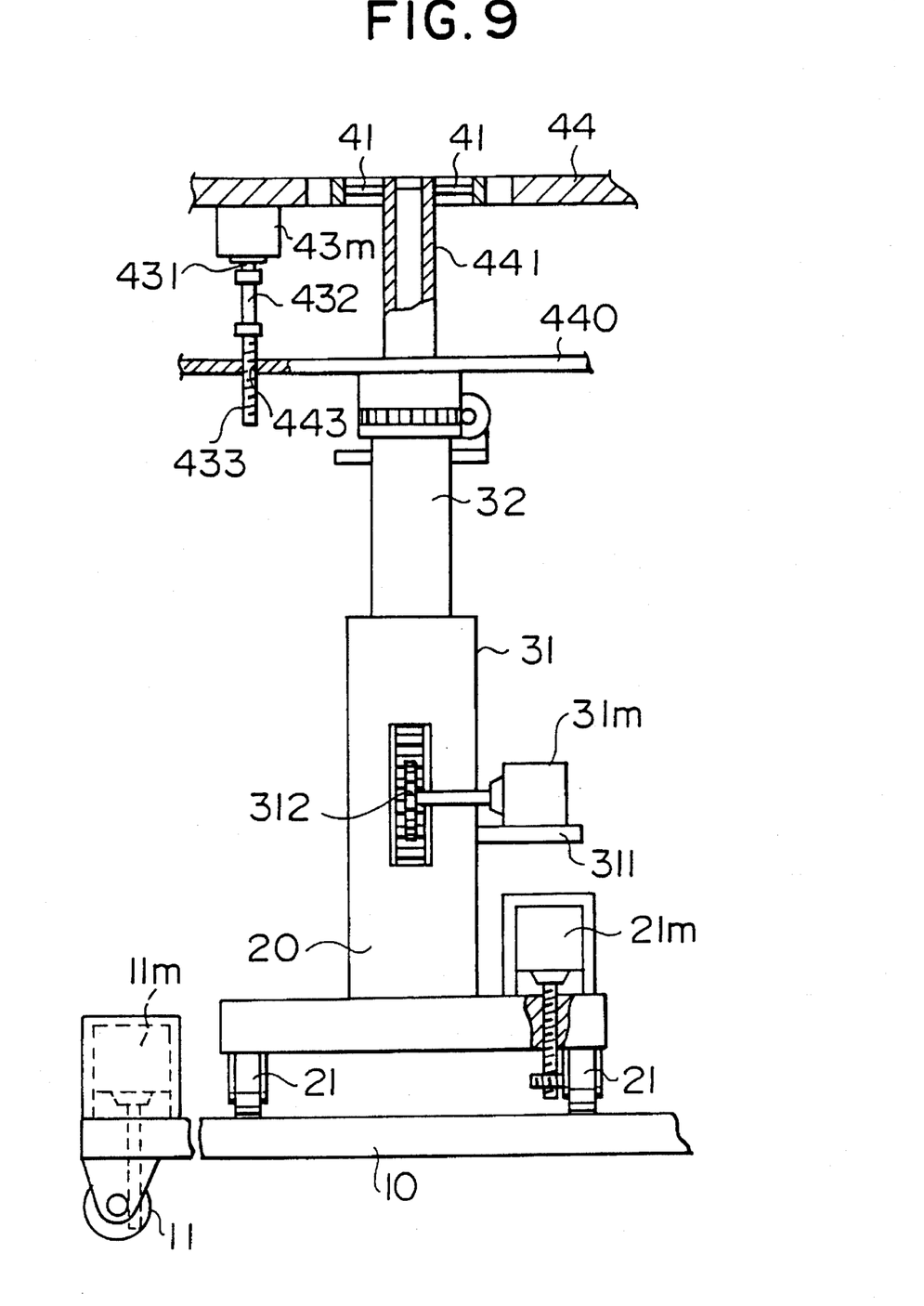

Referring now to FIGS. 7 through 9, the mechanism for moving the hand detecting plate 44 and the mechanism for rotating the hand detecting plate 44 about the supporting rods 41 and 43 will be explained.

FIG. 7 is a plan view of the hand detecting plate 44, in which the edge part of the plate 44 at which the finger detecting portions 46 through 49 are connected is not depicted for simplification. As shown in the figure, a motor 41m for oscillating the hand detecting plate 44 about the supporting rod 41 is provided on the back face of the hand detecting plate 44 at a position away from the supporting rod 41 but on an extension line of the supporting rod 43. Similarly, a motor 43m for oscillating the hand detecting plate 44 about the supporting rod 43 is provided on the back face of the hand detecting plate 44 at a position away from the supporting rod 43 but on an extension line of the supporting rod 41.

At a position of the back face of the hand detecting plate 44 which position is different from the positions of the motors 41m and 43m, there is provided an infrared sensor 44A consisting of a pair of an infrared emitter and a receiver, so that an infrared beam is emitted upward from the hand detecting plate 44, and a reflection of the emitted infrared beam is detected when the hand of the user approaches thereto. With this structure, the direction of the hand can be sensed by using the infrared sensor 44A by changing the direction of the hand detecting plate 44 on which the infrared sensor is mounted. It is also possible to provide a plurality of infrared sensors to detect the direction of the hand relative to the hand detecting plate 44, or to employ a mechanism for changing the direction of the infrared sensor 44A with respect to the hand detecting plate 44.

FIG. 8 is a front view partly showing the cross-section, corresponding to the plan view of FIG. 7. As shown in this figure, a bracket 440 is provided beneath the hand detecting plate 44, in such a manner that the bracket 440 is rotatably engaged on an extended portion 320 of the movable shaft 32, at its central cylindrical portion 441. A driving motor 32m is provided on a horizontal projection 321 of the movable shaft 32, and a worm gear fixed on the spindle of the motor 32m is in mesh with a worm wheel formed at the bottom end of the bracket 440, so that the relative angle $\theta_z$ between the movable shaft 32 and the bracket 440 in the axial direction of the movable shaft 32 is changed by the rotation of the motor 32m. With this mechanism, the rotation of the bracket 440 as well as the hand detecting plate 44 about the axis of the movable shaft extending in parallel with the vertical direction Z shown in FIG. 4 is performed.

The supporting rod 41 is connected at the top end of the cylindrical portion 441 of the bracket 440, so that the ring member 42 is swingingly supported on the supporting rod 41. As shown in FIG. 8, the above-described motor 41m is fixed on the back face of the hand detecting plate 44, and a screw 413 is connected to a rotating shaft 411 of the motor 41m via a flexible wire 412. The screw 413 is in mesh with the thread of a threaded hole 442 formed at a corresponding position of the bracket 440. By the rotation of the motor 41m, the distance between the position of the hand detecting plate 44 at which the motor 41m is fixed and the corresponding position of the bracket 440 (the position of the threaded hole 442) is varied, causing the variation of the angle $\theta_y$ shown in FIG. 4. In this way, the hand detecting plate 44 is driven to oscillate about the supporting rod 41.

The movable shaft 32 is provided to be extended or withdrawn relative to the supporting shaft 31 as mentioned before. As shown in FIG. 8, a rack 322 is formed at a side of the lower part of the movable shaft 32, so that a pinion gear 312 fixed to a rotating shaft of a motor 31m mounted on a projection 311 provided sideways from the supporting shaft 31. With this structure, the movable shaft 32 is projected from and withdrawn into, in the vertical direction, the supporting shaft 31 by the rotation of the motor 31m.

In FIG. 8, there are further shown a motor 21m for rotating the caster 21 of the supporting truck 20, by the rotation of a worm gear meshed with a worm wheel fixed to the caster 21, and a motor 11m for rotating the caster 11 of the movable truck 10, by the rotation of a worm gear meshed with a worm wheel fixed to the caster 11.

FIG. 9 is a partly cross-sectional side view corresponding to FIGS. 7 and 8, taken in a plane including the supporting shaft 41 shown in FIG. 7. The motor 43m for oscillating the hand detecting plate 44 about the supporting rod 43 is provided, as mentioned before, on the back face of the hand detecting plate 44 at a position away from the supporting rod 43 but on an extension line of the supporting rod 41. A screw 433 is connected to a rotating shaft 431 of the motor 43m via a flexible wire 432. The screw 433 is in mesh with the tread of a threaded hole 443 formed at a corresponding position of the bracket 440. By the rotation of the motor 41m, the distance between the position of the hand detecting plate 44 at which the motor 43m is fixed and the corresponding position of the bracket 440 (the position of the threaded hole 443) is varied, causing the variation of the angle $\theta_x$ shown in FIG. 4.

In the structure described above, the motor 31m is driven by the motor driver 54 shown in FIG. 5, and the motors 32m, 41m, and 43m are connected to the motor driver 55 shown in FIG. 5. Therefore, the motor driver 55 includes individual driving circuits for driving the motors 32m, 41, and 43m respectively, and produces output signals at driving circuits in accordance with signals from the control unit 53. The motors 11m and 21m are driven by the motor drivers 56 and 57 shown in FIG. 5, respectively.

The operation of the three-dimensional coordinates input apparatus with such a construction as mentioned above will now be described.

First, when the palm of the hand is put over the hand detecting plate 44 of the hand detecting portion 40, the infrared sensor 44A detects the position of the hand. When the position of the hand is detected, the movable shaft driving motor driver 54 is driven, so that the movable shaft 32 is expanded or contracted in the direction shown by the arrow z and the hand detecting plate 44 is moved to the palm of the hand until a position of a predetermined distance.

When the hand in the real space is moved in either the front/back directions, the left/right directions, or the upper/lower directions in the above state, the moving truck 10 and/or the supporting truck 20 and/or the drive shaft 30 are driven and the hand detecting plate 44 is moved so as to trace the motion of the hand. In this instance, the plate 44 is moved to the palm of the hand with a predetermined distance held.

The graphic data generating section 59, in this instance, generates the graphic data indicative of the position and posture of the hand on the basis of the results of the detections of the infrared sensor 44A and ultrasonic sensor 45A. The image of the hand in the screen, consequently, is moved in accordance with the motion of the hand in the real space.

When the fingers in the real space are moved so as to grasp an arbitrary object in the screen in the above state, the ultrasonic sensor 45A detects the bending states or the like of the fingers. The finger detecting portions 45 to 49 are rotated in the $\theta_x$, $\theta_y$, and $\theta_z$, directions at predetermined distances from the fingers in the real space in accordance with the result of the detection of the ultrasonic sensor 45A, respectively.

The graphic data generating section 59, in this instance, generates the graphic data indicative of the positions and postures of the hand and fingers on the basis of the results of the detections of the infrared sensor 44A and the ultrasonic sensor 45A. The image of the hand in the screen, consequently, is moved so as to grasp an arbitrary object in the screen in accordance with the motions of the fingers of the hand in the real space.

In the case where, for example, a ball in the screen is grasped similarly by the image of the hand in the screen as mentioned above, data to give a tactile sensation as elasticity of the ball is supplied to the control section 53. The control section 53 rotates the finger detecting portions 45 to 49 in the link rotary axis directions through the finger portion driving motor driver 58 by using either ones of the axes (45a and 45b; . . . ; 49a and 49b) as fulcrums, respectively. Due to this, the depressing forces by the finger detecting portions 45 to 49 act on the fingers in the real space which are located over the finger detecting portions 45 to 49 at distances away therefrom. A tactile sensation of the ball by the image of the hand in the screen is fed back.

When the tactile sensation is fed back by the finger detecting portions 45 to 49, it is also possible to construct in a manner such that an expanding/contracting mechanism is provided for at least each joint of each of the finger detecting portions 45 to 49 and a pushing and returning force can be allowed to act on the finger head.

The data indicative of the tactile sensation as mentioned above is determined by interaction between a solid model in the screen and the image of the hand and is obtained, for example, by a program such that a virtual solid body corresponding to the real scale model (1/1 model) of a single-reflex camera such that it is used in an industrial design can be grasped by the hand.

According to the embodiment as mentioned above, the hand detecting plate 44 and the finger detecting portions 45 to 49 are set into contactless states for the hand and fingers and the graphic data is obtained by moving or rotating the hand detecting plate 44 and the finger detecting portions 45 to 49 in accordance with the motions of the hand and fingers. Therefore, the operations to put on and insert the data glove 1 and touch glove 4 or the like to the hand and fingers as in the conventional apparatus are eliminated. The feeling of discordancy is not produced during the motions of the hand and fingers.

When the object of the three-dimensional computer graphics is grasped by the hand of the graphics formed on the basis of the three-dimensional coordinates data, a tactile sensation is given to the fingers in the real space by depressing the finger detecting portions 45 to 49 to the fingers in the real space, so that a false experience can be made more realistic.

Since the motion of the hand is detected by the infrared sensor at a position of an extremely short distance, further, a detection precision is higher and a higher response speed are derived as compared with those of the magnetic sensor 3 in the conventional three-dimensional coordinates input apparatus.

Figure 10:
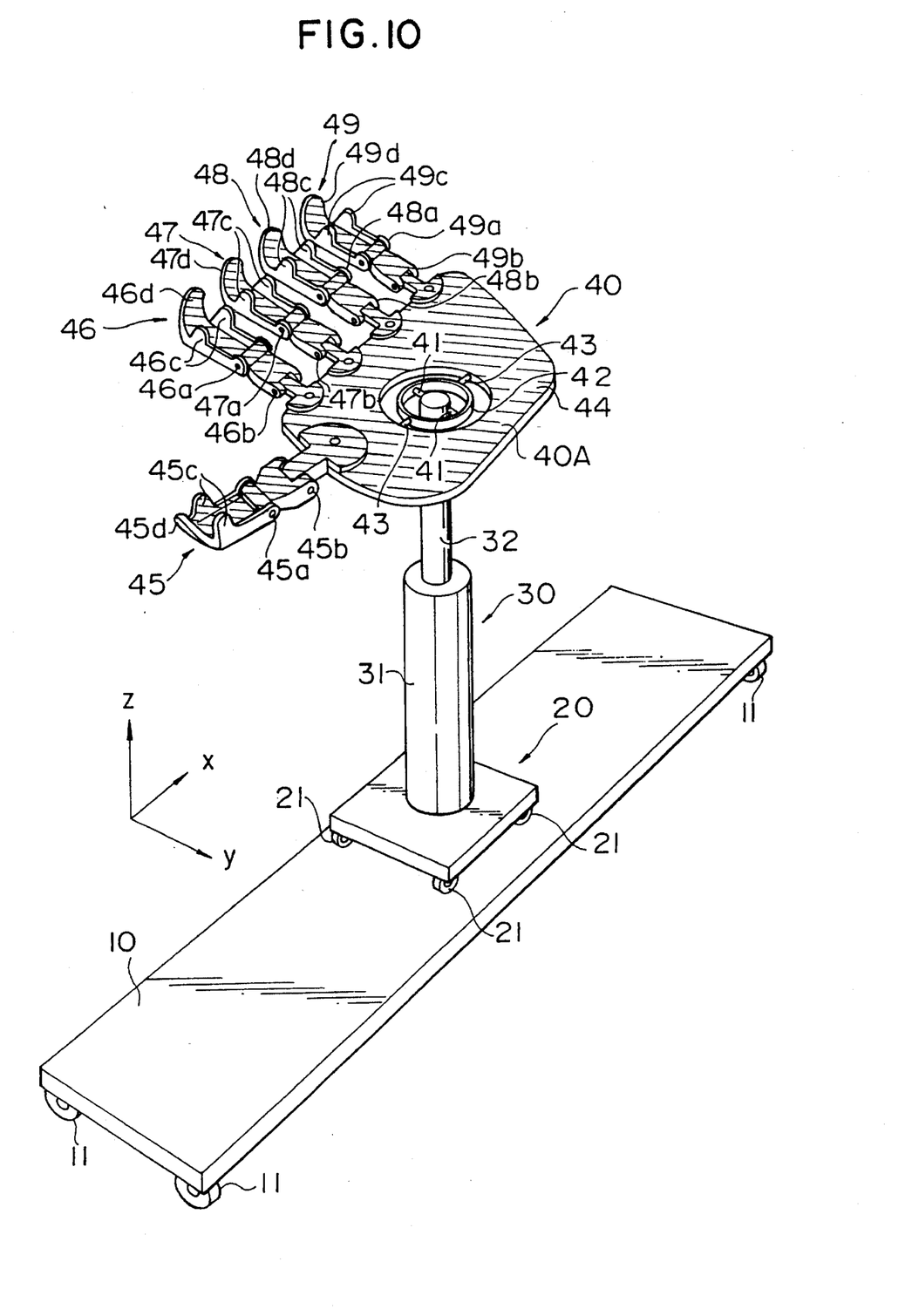
FIG. 10 is a perspective view showing another embodiment in case of changing a construction of the three-dimensional coordinates input apparatus of FIG. 4.

FIG. 10 shows another embodiment in case of changing a construction of the three-dimensional coordinates input apparatus of FIG. 4. In this embodiment, the infrared sensor 44A to detect the position of the hand in the real space as mentioned above and a piezoelectric film 40A to detect the posture or the like of the hand are provided over and on the hand detecting section 40.

Figure 11:
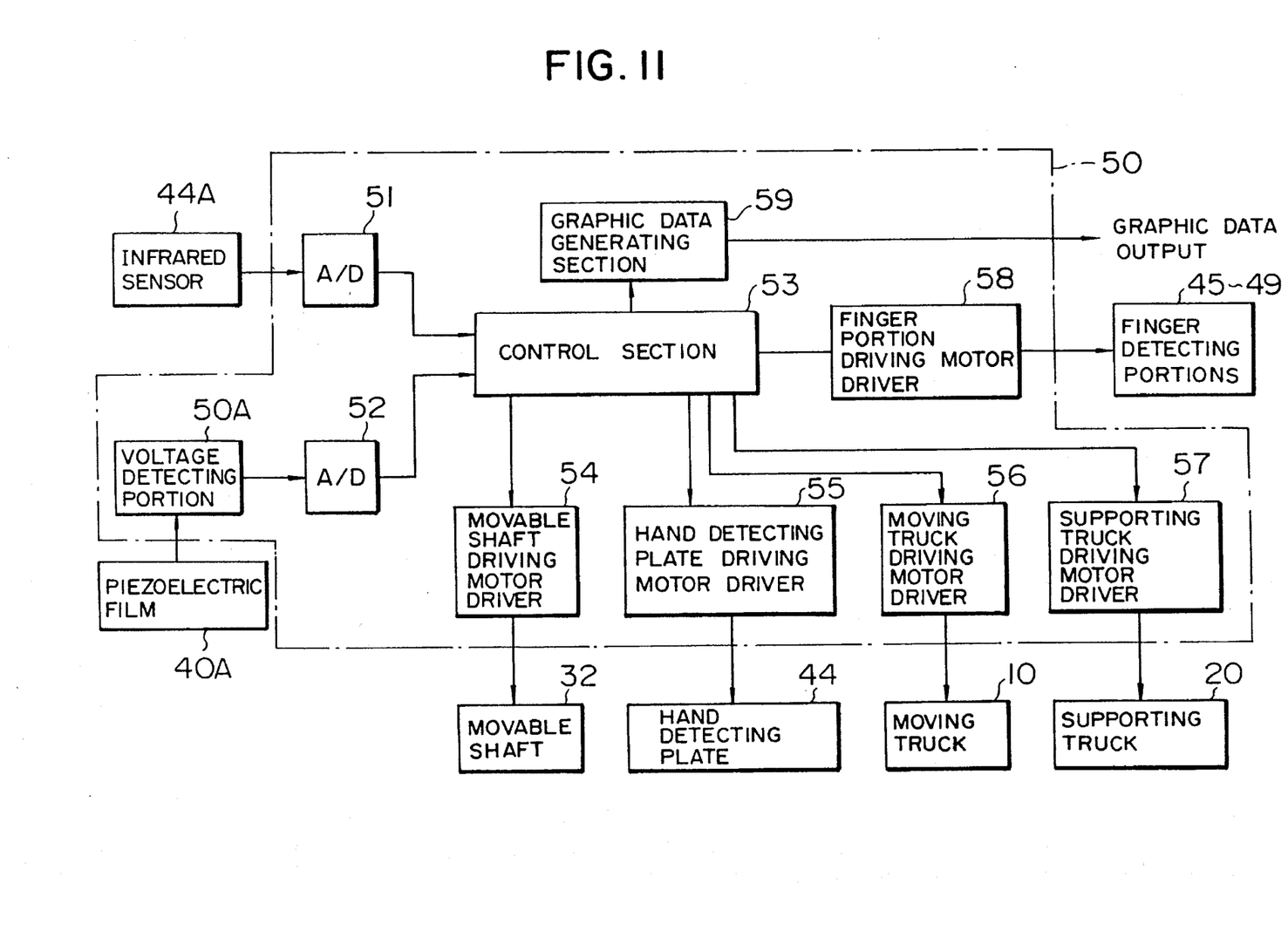
FIG. 11 is a block diagram showing a construction of a control system to control the operation of the three-dimensional coordinates input apparatus of FIG. 10.

FIG. 11 briefly shows a construction of a control system to control the operation of each component element of the three-dimensional coordinates input apparatus of FIG. 10. In place of the ultrasonic sensor 45A shown in FIG. 5, a voltage detecting section 50A to detect a voltage which is generated by a piezoelectric effect of the piezoelectric film 40A is provided.

According to the three-dimensional coordinates input apparatus with such a construction, when the palm of the hand is put over the hand detecting plate 44 of the hand detecting portion 40 in a manner similar to that mentioned above, the infrared sensor 44A detects the position of the hand and the hand detecting plate 44 approaches the palm of the hand.

After the position of the hand was detected by the infrared sensor 44A, when the hand is moved in either the right/left directions or the front/back directions, the hand detecting plate 44 moves so as to trace the hand.

In this instance, the graphic data generating section 59 generates the graphic data indicative of the position of the hand on the basis of the result of the detection of the infrared sensor 44A. The image of the hand in the screen, consequently, is moved in accordance with the motion of the hand in the real space.

The palm of the hand and the fingers are subsequently come into contact with the hand detecting plate 44 of the hand detecting portion 40 and the finger detecting portions 45 to 49. It is also possible to allow a bias force to act on the drive shaft 30 so as to cancel the tare-weight of the hand in the z direction.

When the finger in the real space is moved in the above state so as to grasp an arbitrary object in the screen, the finger detecting portions 45 to 49 are rotated in the $\theta_x$ and $\theta_y$ directions in accordance with motions of the fingers. In this instance, pressures from the fingers are applied to the piezoelectric film 40A provided for the finger detecting portions 45 to 49 and a voltage according to the finger pressures is generated by the piezoelectric effect of the piezoelectric film.

When the voltage detecting section 50A detects the above voltage, the control section 53 recognizes bending angles or the like of the fingers and generates the graphic data indicative of the positions and postures of the hand and fingers through the graphic data generating section 59. The image of the hand in the screen, consequently, is moved so as to grasp an arbitrary object in the screen in accordance with the motions of the fingers of the hand in the real space.

In the case where, for instance, a ball in the screen is grasped likewise by the image of the hand in the screen, the pressing forces by the finger detecting portions 45 to 49 act on the fingers and the tactile sensation of the ball by the image of the hand in the screen is fed back in a manner similar to the above.

According to the embodiment as mentioned above, the motions of the hand and fingers are detected by the voltage detecting section 50A provided in the hand detecting portion 40, so that the motions of the hand and fingers can be finely detected. Consequently, the three-dimensional coordinates data can be obtained at a higher precision.

Although the embodiment has been described above with respect to the case where the piezoelectric film 40A has been provided for the hand detecting portion 40, the invention is not limited to the above example. It is also possible to combine the sensors in a manner such that the palm of the hand is detected by using a contact sensor such as a piezoelectric film 40A or the like and the motions of the fingers or the like are detected by a contactless sensor such as an ultrasonic sensor or the like mentioned above.

Although each of the above embodiments has been described above with respect to the case where the present invention is applied to the three-dimensional coordinates input apparatus to obtain virtual graphic data, the invention is not limited to such an example. The invention can be also applied to an apparatus such that the operation data for a robot or a manipulator locating at a remote position is obtained by a remote operation.

According to the three-dimensional coordinates input apparatus of the present invention as described above, when the palm of the hand is put over the hand detecting means, the hand detecting means is made approach the palm of the hand to a position of a predetermined distance and is also moved so as to trace the movement of the hand. When the fingers are bent at a position near the finger detecting means, the finger detecting means is bent in accordance with the bending state of the fingers. The three-dimensional coordinates data of the hand and fingers is produced on the basis of the results of the detections of the positions and postures of the hand and fingers by the hand detecting means and the finger detecting means. When the hand of the graphics formed on the basis of the three-dimensional coordinates data grasps the object of the three-dimensional computer graphics, the fingers detecting means is depressed to the fingers in the real space, thereby giving a tactile sensation.

The motions of the hand and fingers in the real space, consequently, can be accurately and easily detected by a simple construction and a feeling of discordancy is not produced for the motions of the hand and fingers in the real space.

What is claimed is:

1. A three-dimensional coordinates input apparatus for supplying three-dimensional coordinates data, comprising:

hand detecting means for detecting a position and a posture of a hand;

finger detecting means for detecting positions and postures of fingers;

hand detection means moving means for moving said hand detecting means in horizontal and vertical directions;

rotating means for rotating said hand detecting means and said finger detecting means;

tracing means for controlling said hand detection means moving means to move said hand detecting means to approach the palm of the hand to a position of a predetermined non-zero distance and for controlling said hand detection means moving means to move said hand detecting means to trace movement of said hand when the palm of the hand is put over said hand detecting means based on the detecting by said hand detecting means;

finger detection responsive bending means, responsive to said positions and postures detected by said finger detecting means, for bending said finger detecting means in accordance with a bending state of the fingers when the fingers are detected to be bent at a position near but spaced from said finger detecting means by a predetermined non-zero distance; and coordinate data producing output means for producing three-dimensional coordinate data of the hand and fingers based on results of the detections of said positions and postures of the hand and fingers in real space by said hand detecting means and said finger detecting means.

2. The apparatus of claim 1, further comprising tactile sensation giving means for giving a tactile sensation by depressing said finger detecting means to the fingers.

* * * * *